(12) United States Patent
Mann

(10) Patent No.: US 10,443,199 B1
(45) Date of Patent: Oct. 15, 2019

(54) APPARATUS FOR COLLECTING ANIMAL WASTE

(71) Applicant: Dwight Mann, Orlando, FL (US)

(72) Inventor: Dwight Mann, Orlando, FL (US)

( * ) Notice: Subject to any disclaimer, the term of this patent is extended or adjusted under 35 U.S.C. 154(b) by 0 days.

(21) Appl. No.: 16/210,321

(22) Filed: Dec. 5, 2018

(51) Int. Cl.
*A01K 23/00* (2006.01)
*E01H 1/12* (2006.01)

(52) U.S. Cl.
CPC ......... *E01H 1/1206* (2013.01); *A01K 23/005* (2013.01); *E01H 2001/128* (2013.01); *E01H 2001/1293* (2013.01)

(58) Field of Classification Search
CPC .......... E01H 1/1206; E01H 2001/1226; E01H 2001/1293; A01K 23/005; A45B 2025/003; A45B 2200/1009; A45B 2200/1054
USPC ............................................. 294/1.5; 135/16
See application file for complete search history.

(56) References Cited

U.S. PATENT DOCUMENTS

| | | | | |
|---|---|---|---|---|
| 3,819,220 A * | 6/1974 | Bredt | ................... | A01K 23/005 294/1.5 |
| 4,010,970 A * | 3/1977 | Campbell | ............ | A01K 23/005 294/1.5 |
| 4,193,623 A * | 3/1980 | Forsythe | .............. | A01K 23/005 135/16 |
| 4,335,678 A * | 6/1982 | Garza | ................... | A01K 23/005 294/1.5 |
| 4,466,647 A * | 8/1984 | Spevak | ................ | A01K 23/005 294/1.5 |
| 4,995,661 A * | 2/1991 | Aurness | ................ | E01H 1/1206 294/1.4 |
| 5,033,781 A * | 7/1991 | Flood | .................... | E01H 1/1206 15/257.6 |
| 6,554,335 B1 | 4/2003 | Kelly | | |
| 6,840,000 B2 * | 1/2005 | Akhtar | ................. | A01K 23/005 43/12 |
| 7,267,381 B2 | 9/2007 | Cafferty | | |
| 7,407,207 B2 * | 8/2008 | Yilmaz | ................ | A01K 23/005 294/1.4 |
| 7,854,455 B2 * | 12/2010 | Ruscil | .................. | A01K 23/005 294/1.5 |
| 8,177,270 B2 | 5/2012 | Chen | | |
| 2010/0072765 A1 * | 3/2010 | Granado | .............. | A01K 23/005 294/1.4 |

* cited by examiner

*Primary Examiner* — Dean J Kramer
(74) *Attorney, Agent, or Firm* — Sanchelima & Associates, P.A.; Christian Sanchelima; Jesus Sanchelima

(57) ABSTRACT

An apparatus for collecting animal waste is disclosed. The apparatus comprises an elongated tube comprising a first end and a second end. The apparatus comprises a plurality of ribs coupled to the elongated tube at the first end. Further, the apparatus comprises a runner provided at the elongated tube. Movement of runner along the elongated tube allows to collapse or to open the ribs. The apparatus is provided with a disposable bag coupled to the ribs. The runner is adjusted to open the ribs and the disposable bag is aligned with a derriere of a pet to collect the animal waste during defecation process of the pet. Subsequently, the disposable bag containing the animal waste is disposed.

9 Claims, 5 Drawing Sheets

APPARATUS FOR COLLECTING ANIMAL WASTE

BACKGROUND OF THE INVENTION

1. Field of the Invention

The present disclosure generally relates to an apparatus for collecting animal waste. More particularly, the present disclosure relates to an apparatus, which can be selectively operated to collect animal waste and can be used as a walking stick.

2. Description of the Related Art

It is known many people keep pets or companion animals at house. Most popular pets include dogs and cats among other animals. People may keep the pets for variety of reasons such as for person's company, protection, or entertainment. At times, an occupant of the house may take the pet out along the public way, i.e. sidewalks, park trails, public and private lawns, school-yards and public and private urban areas. The pet may release animal waste while at home or when taken out. As known, it is important to keep the house as well as public way clean at all times for variety of reasons such as hygiene, littering the public way and so on.

Considering the cleanliness to be maintained in public ways, several cities and municipalities have stipulated laws for owners of the animal owners, to restrain their pets, by having them attached to a leash, and to retrieve their animal waste. This is to prevent others from stepping in or on the waste, and to inhibit the health risk associated with its presence.

Sometimes, the owners of the pet may carry "pooper-scoopers", a newspaper, tissue and plastic litterbags to clean up the animal waste of the pet. At the time of picking up and/or transporting and delivering the animal waste of the pet, the owners may accidently come in contact with the animal waste with his or her hands. As a result, it is very odious and unpleasant task for the owners. Further, there is a risk of leakage when using newspaper, tissues and plastic litterbags to pick and dispose of the animal waste.

In order to overcome the problems of using the "pooper-scoopers", newspapers, tissues and plastic litterbags, several devices have been provided in the past that is used to collect the animal waste. An example of a device for collecting animal waste is disclosed in a U.S. Pat. No. 7,267,381. In U.S. Pat. No. 7,267,381B2, a new, unique, lightweight and compact dog waste-collection device and bag disposal system is disclosed for the sanitary and convenient capture and disposal of dog waste comprised of a telescoping plastic handle and a collection bag rim which can be easily transformed from the closed "carry" position 120 degrees to the open "working" position. The device is positioned behind an eliminating dog and catches the waste before it hits the ground. The bag is removed with a simple downward pull and disposed of in an environmentally responsible manner.

Another example of the device for collecting animal waste is disclosed in a U.S. Pat. No. 8,177,270. In U.S. Pat. No. 8,177,270B2, a dog feces collecting device including two loops and a plurality of connecting members for holding the two loops together forming a plurality of bag-clamping sections each comprising two loop segments is disclosed.

Yet another example of the device for collecting animal waste is disclosed in a U.S. Pat. No. 6,554,335. In U.S. Pat. No. 6,554,335B1, a pet waste collection system for use with dogs, cats, and other pets to collect their solid waste is disclosed. The pet waste collection system includes a main housing having a hollow inside and having a top, a bottom, a front, and a back and at least one sidewall, and having an opening accessible to the hollow inside area. There is also a telescopically extendable and contractible pole attached at a first end to the hollow inside area of the main housing and attached to a collapsible frame at its second end. The collapsible frame unfolds for a waste receptacle, i.e. a "pooper" bag, and is spaced behind the pet during defecation.

Yet another example of the device for collecting animal waste is disclosed in a United States patent application 20100072765. In US20100072765A1, a portable device for collecting pet feces including an elongated, support bar having a first end and a second end is disclosed. The first end of the support bar is provided with a handle for gripping by a user and the second end of the support bar is provided with a bag holder adjustably connected thereto. The bag holder is composed of an inner first ring and an outer second ring that cooperate to function as a clamp to secure a collection bag therebetween for collection of pet feces.

Although the devices discussed above are helpful in collecting the animal waste, they have few problems. For example, considering the devices disclosed in U.S. Pat. No. 7,267,381B2 and U.S. Pat. No. 8,177,270B2, the collection bag rim is always coupled to the telescopic handle in a perpendicular manner. As a result, it is uneasy to carry around the devices of the above type. Further, the device disclosed in U.S. Pat. No. 6,554,335B1 is bulky due to the shape of the main housing.

Other documents describing the closest subject matter provide for a number of more or less complicated features that fail to solve the problem in an efficient and economical way. None of these patents suggest the novel features of the present invention. Specifically, none of the disclosures in the art disclose an apparatus that is easy to operate and can be used for collecting and disposing of animal waste with ease. Further, none of them disclose the apparatus that can be used as a walking stick.

Therefore, there is a need in the art for an apparatus for collecting and disposing of animal waste with ease and the apparatus that can also be used as walking stick by a user.

SUMMARY OF THE INVENTION

It is one of the main objects of the present invention to provide an apparatus for collecting and disposing of animal waste and avoids the drawbacks of the prior art.

It is one object of the present invention to provide the apparatus for collecting animal waste and to use the apparatus as a walking stick.

It is one object of the present invention to provide an apparatus for collecting animal waste. The apparatus comprises an elongated tube comprising a first end and a second end. The apparatus comprises a plurality of ribs coupled to the elongated tube at the first end. Further, the apparatus comprises a runner provided at the elongated tube. Movement of the runner along the elongated tube allows to collapse or to open the ribs. The apparatus is provided with a disposable bag coupled to the ribs. The runner is adjusted to open the ribs and the disposable bag is aligned with a derriere of a pet to collect the animal waste during defecation process of the pet. Subsequently, the disposable bag containing the animal waste is disposed.

It is another object of the present invention to provide the disposable bag coupled to the ribs using one of a clip, a latch and an adhesive.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an apparatus for collecting animal waste. The apparatus comprises an elongated tube comprising a first end and a second end. The apparatus comprises a plurality of ribs coupled to the elongated tube at the first end. Further, the apparatus comprises a runner provided at the elongated tube. Movement of runner along the elongated tube allows to collapse or to open the ribs. The apparatus is provided with a disposable bag coupled to the ribs. The runner is adjusted to open the ribs and the disposable bag is aligned with a derriere of a pet to collect the animal waste during defecation process of the pet. Subsequently, the disposable bag containing the animal waste is disposed.

Various features and embodiments of an apparatus for collecting animal waste are explained in conjunction with the description of FIGS. 1-5.

Figure 1:
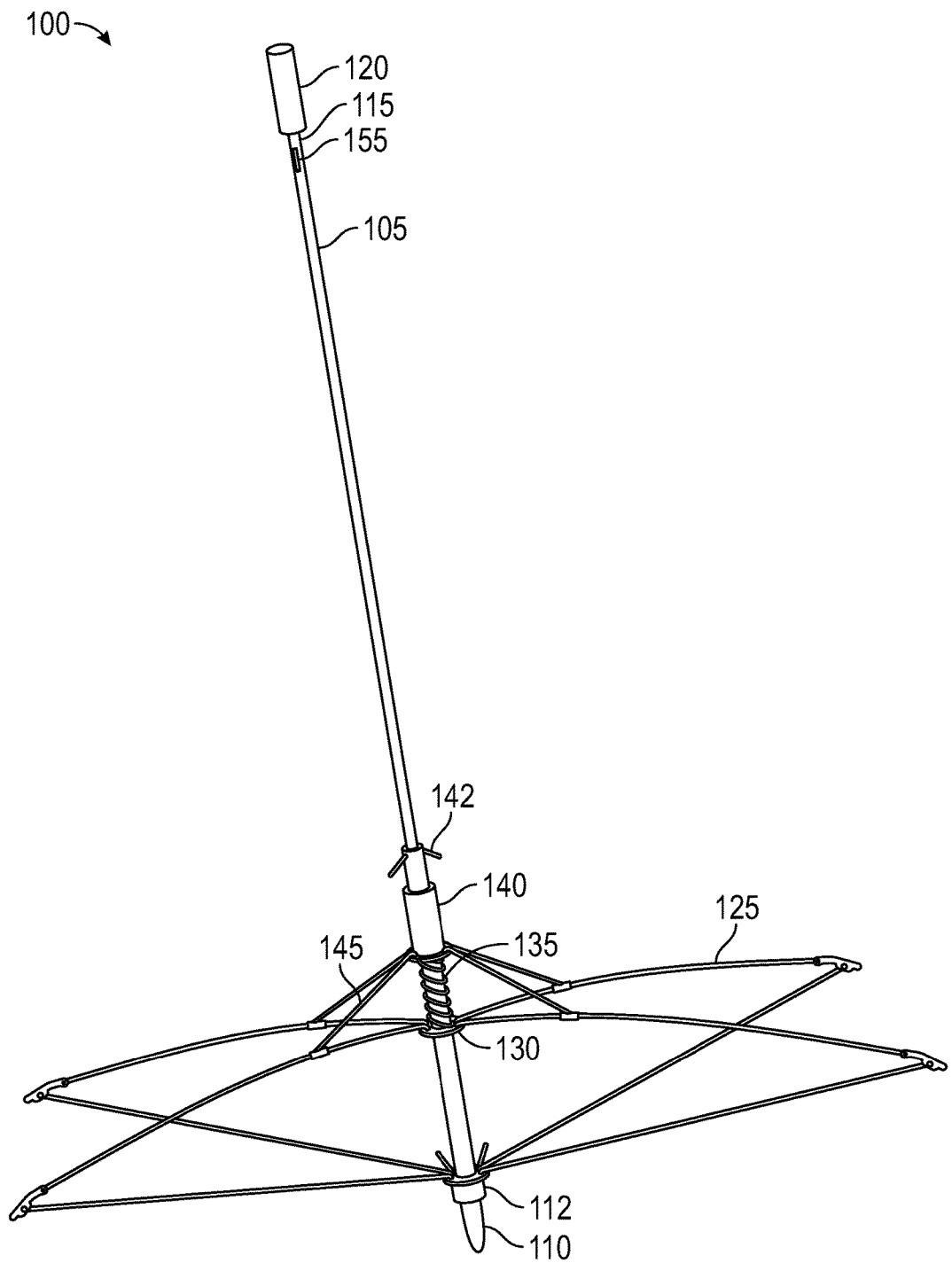
FIG. 1 illustrates an apparatus 100 for collecting animal waste, the apparatus 100 comprising ribs 125 in open position, in accordance with one embodiment of the present disclosure.

Referring to FIG. 1, an apparatus 100 for collecting animal waste is shown, in accordance with one embodiment of the present disclosure. The apparatus 100 comprises an elongated tube 105 made up of plastic, metal or any other suitable material. It should be understood that the length of the elongated tube 105 is adjustable. The elongated tube 105 comprises a first end 110 and a second end 115. The first end 110 may comprise a finial 112. At the second end 115, the elongated tube 105 comprises a handle 120 which a user can hold to operate the apparatus 100.

Further, the apparatus 100 comprises a plurality of ribs 125 coupled to the finial 112 at the first end 110. Further, apparatus 100 may comprise a coupler 130. The coupler 130 comprises a spring member 135. The elongated tube 105 further comprises a runner 140 having pins 142. The runner 140 comprises a plurality of connectors 145 used to couple the runner 140 to the ribs 125. As can be seen in FIG. 1, the connectors 145 are coupled to the ribs 125 at one end and to the runner 140 at the other end. In one example, the runner 140 comprises a protrusion (not shown) at its inner side facing the elongated tube 105.

Figure 2:
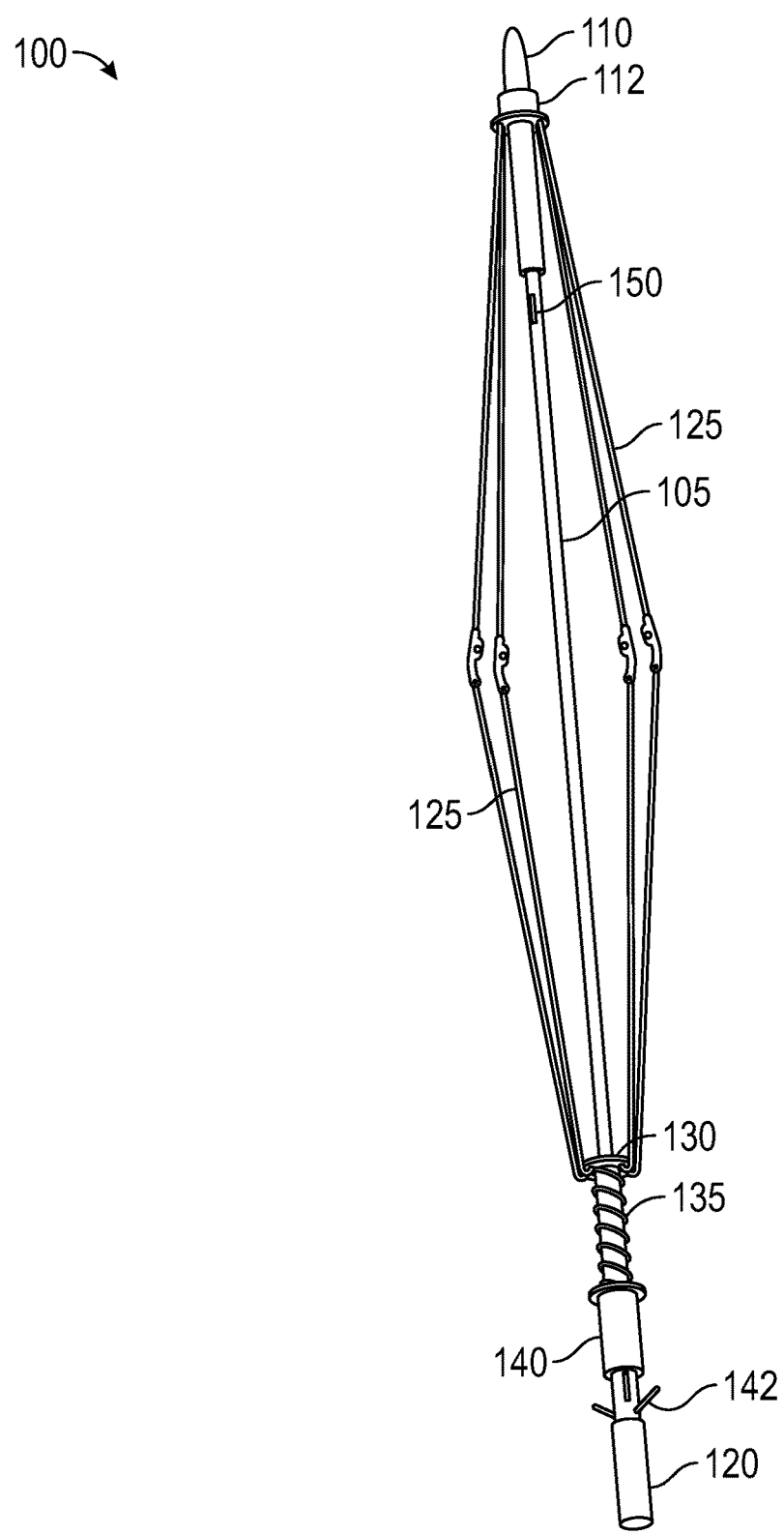
FIG. 2 illustrates the apparatus 100 in which the ribs 125 are collapsed or closed, in accordance with one embodiment of the present disclosure.

Referring to FIG. 1 and FIG. 2, the elongated tube 105 comprises a first opening 150 and a second opening 155 It should be noted that FIG. 1 is shown to illustrate the apparatus 100 in open position. Further, FIG. 2 is shown to illustrate the apparatus 100 in closed position. In order to open the apparatus 100, the user of the apparatus 100 may push the runner 140 towards the first end 110 such that the runner 140 comes on top of the first opening 150. When the runner 140 reaches the first opening 150, the protrusion provided at the runner 140 is made to enter into the first opening 150 thereby locking the runner 140 to the first opening 150. When the runner 140 is locked to the first opening 150, the ribs 125 are spread out as shown in FIG. 1.

In order to collapse the ribs 125 i.e., to bring the apparatus 100 to closed position, the user may rotate the pins 142 provided at the runner 140 such that the protrusion is made to come out of the first opening 150 thereby freeing the runner 140. After unlocking the runner 140, the user may push the runner 140 towards the second end 115. When the runner 140 reaches the second opening 155, the protrusion enters the second opening 155 and locks the position of the runner 140 at the second opening 155. When the runner 140 is locked at the second opening 155, the ribs are collapsed as shown in FIG. 2. It should be understood that the spring member 135 facilitates in moving the runner 140 along the length of the elongated tube 105. Further, it should be understood that the operation of the apparatus 100, operation of the runner 140 to open or collapse the ribs 125 is similar to conventional umbrella.

Figure 3:
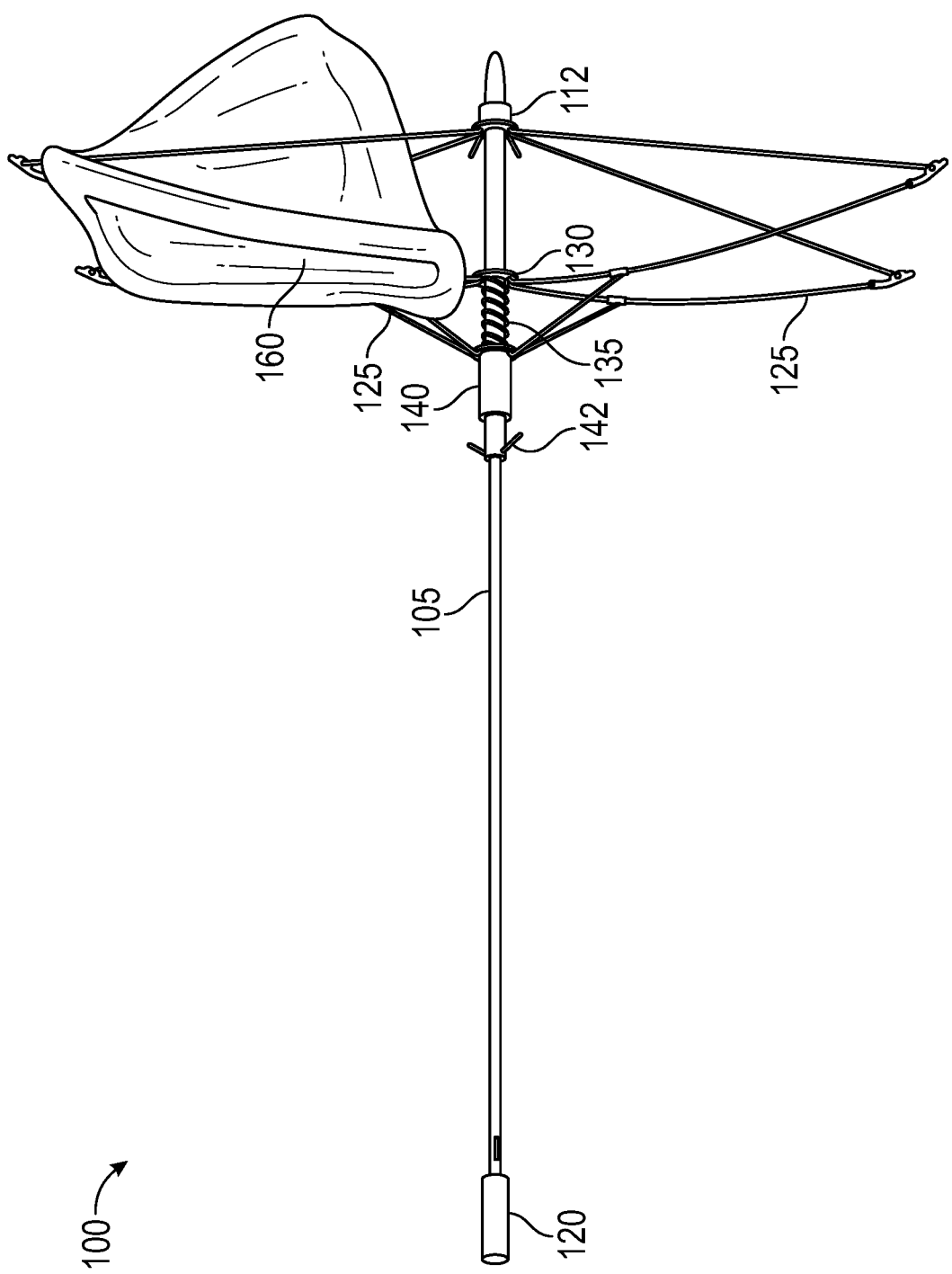
FIG. 3 illustrates the ribs 125 provided with a disposable bag 160, in accordance with one embodiment of the present disclosure.

In accordance with one embodiment of the present disclosure, the apparatus 100 can be used for collecting animal waste. In order to collect animal waste, the apparatus 100 may be provided with a disposable bag 160. Specifically, the disposable bag 160 may be provided at the ribs 125, as shown in FIG. 3. The disposable bag 160 may indicate a waste receptacle made up of a plastic or wax paper bag. The disposable bag 160 may be coupled to the ribs 125 using known mechanism such as a clip, latch or other mechanical means, In one preferred embodiment, the disposable bag 160 may be provided with adhesion or an adhesive strip so that the disposable bag 160 may be curled over the ribs 125 to stick the disposable bag 160 to the ribs 125. Further, if adhesive or adhesive strip is used, then the adhesive should be sticky enough to hold during use, but releasable for removal when finished.

Preferably, the user may couple the disposable bag 160 to the ribs 125 when the apparatus 100 i.e., the ribs 125 are in open position. After coupling the disposable bag 160, the user may close the apparatus 100 i.e., collapse the ribs 125 by moving the runner 140 to the second opening 155, as shown in FIG. 4.

Figure 4:
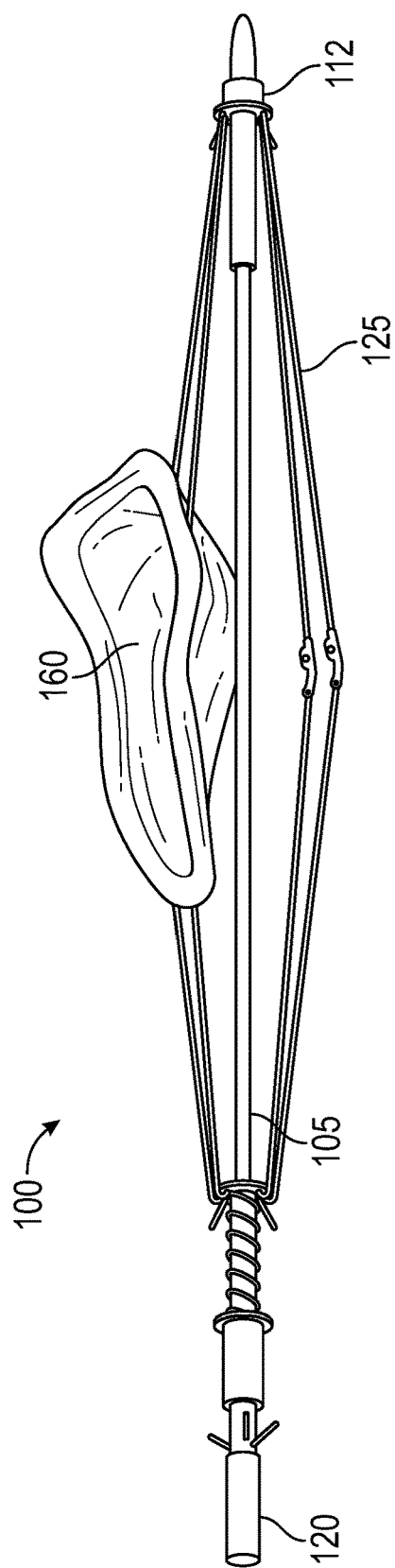
FIG. 4 illustrates the ribs 125 having the disposable bag 160 in closed position, in accordance with one embodiment of the present disclosure.

The user may carry the apparatus 100 (as shown in FIG. 4) as a walking stick when not in use i.e., when walking down a pet at a public way, i.e. sidewalks, park trails, public and private lawns, school-yards and public and private urban areas. Upon realizing that the pet is about to release animal waste i.e., fecal matter, the user may use the apparatus 100 for collecting animal waste and dispose the waste or dispose the waste along the disposable bag 160.

Figure 5:
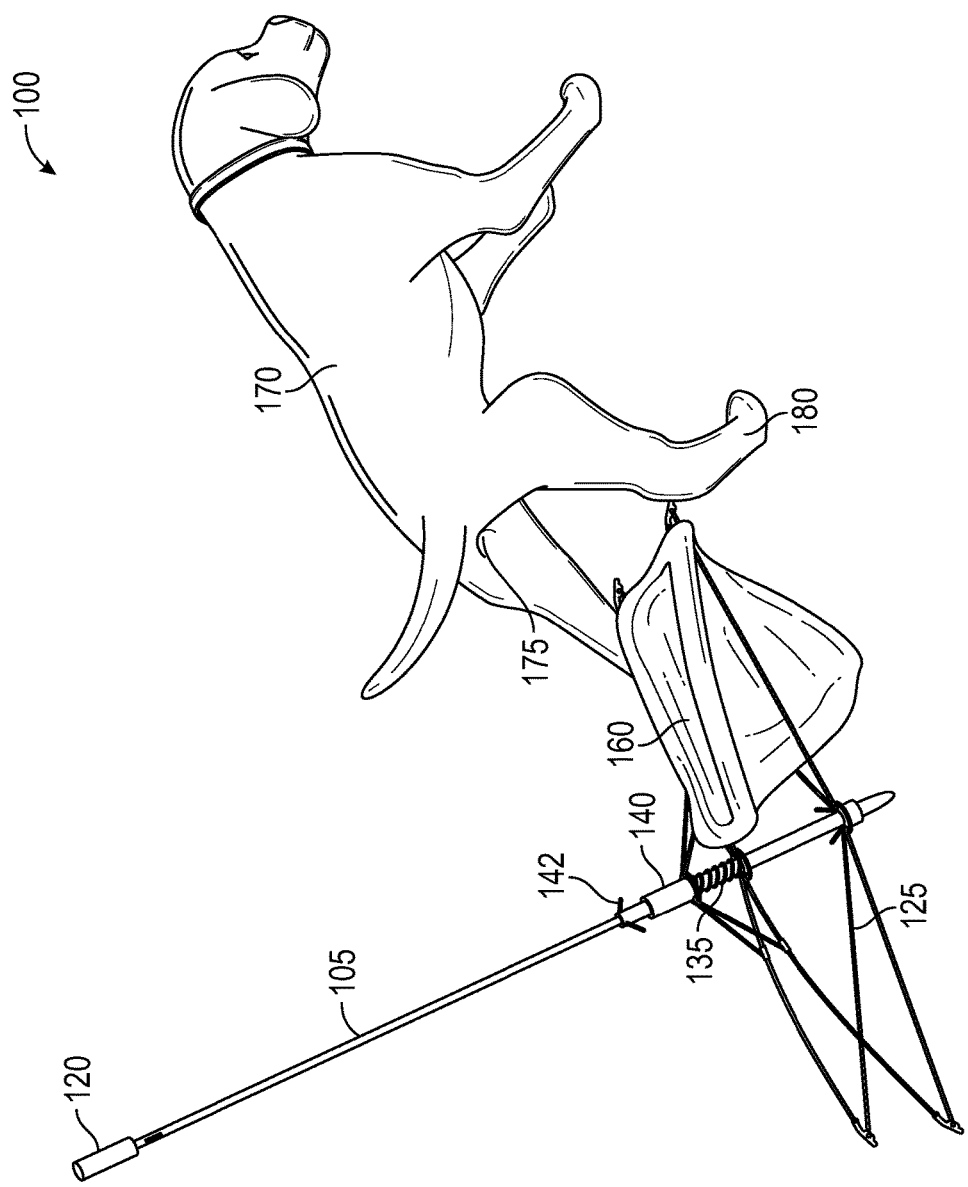
FIG. 5 illustrates the apparatus 100 for collecting pet's 170 waste or fecal matter, in accordance with one exemplary embodiment of the present disclosure.

Referring to FIG. 5, a schematic representation of the apparatus 100 used to collect animal waste of a pet 170 is shown, in accordance with one exemplary embodiment of the present disclosure. As specified above, when the user realizes that the pet 170 is about to release the fecal matter or while the pet 170 is releasing the fecal matter, the user may move the runner 140 to the first opening 150 such that the ribs 125 are spread out and the disposable bag 160 is opened. Subsequently, the disposable bag 160 in open position may be placed underneath the pet's 170 derriere 175 and between the pet's rear legs 180 to collect the pet's 170 fecal matter into the disposal bag 160 during the pet's 170 defecation process and before the pet's 170 fecal mater hits ground or pavement.

Upon completion of the pet's 170 defecation, the user may remove the apparatus 100 from beneath the pet's 170 derriere 175. Subsequently, the user may remove the disposal bag 160 and dispose the disposal bag 160 containing the pet's 170 fecal mater.

After disposing of the fecal mater, the user may couple another disposal bag 160 to ribs 125 and close or collapse the ribs 125. It should be understood that the user has to manually operate the runner 140 to bring the ribs 125 from open position to the closed position or vice versa.

It should be understood that the user might carry a bundle of disposal bags to replace them in the ribs after every use.

In one exemplary embodiment, the handle may be provided with an illuminating unit i.e., a light (not shown) coupled to a battery (not shown) provided at the elongated tube. The user may turn on the illuminating unit to use the apparatus for collecting animal waste at dark i.e., nighttime.

In another exemplary embodiment, the elongated tube may be provided with a notch/groove along its length to keep it in line and the cover when transporting or storing.

It is evident from the above disclosure that the apparatus described herein can be used as a walking stick when not in use. Further, the apparatus can be used to collect animal waste or fecal matter before the pet's fecal mater hits ground or pavement. In the preferred embodiment, the disposal bag is placed in the ribs to collect the fecal matter so that the disposable bag can be disposed after collecting the fecal matter. As such, the apparatus can be used kept clean for a longer period and there is no need to clean the apparatus frequently.

It should be understood that length of the elongated tube can be adjusted based on the height of the user or based on the need. Further, size and shape of the ribs can be changed as per need or preference and such variations are apparent to a person skilled in the art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for collecting animal waste, the apparatus comprising:
    an elongated tube comprising a first end and a second end; wherein the elongated tube comprises a first opening and a second opening in proximity to the first end and the second end respectively;
    a plurality of ribs coupled to the elongated tube at the first end;
    a runner provided at the elongated tube, wherein the movement of runner along the elongated tube allows to collapse and to open the ribs; and
    a disposable bag coupled to the ribs, wherein the runner is adjusted to open the ribs and the disposable bag is aligned with a derriere of a pet to collect the animal waste during defecation process of the pet.

2. The apparatus of claim 1, further comprises a handle at the second end.

3. The apparatus of claim 1, further comprises a finial at the first end.

4. The apparatus of claim 1, wherein the disposable bag is coupled to the ribs using one of a clip, a latch and an adhesive strip.

5. The apparatus of claim 4, wherein the disposable bag is made up of a plastic or wax paper bag.

6. The apparatus of claim 1, wherein the runner comprises a spring member to facilitate movement of the runner along the elongated tube.

7. The apparatus of claim 1, wherein the ribs are provided with connectors, wherein the connectors are coupled to the ribs at one end and to the runner at the other end.

8. The apparatus of claim 1, wherein the runner comprises a protrusion, wherein when the runner is moved along the elongated tube, wherein the protrusion is made to enter the first opening to lock the runner at the first opening to spread the ribs, and wherein the protrusion is made to enter the second opening to lock the runner at the second opening to collapse the ribs.

9. An apparatus for collecting animal waste, the apparatus comprising:
    an elongated tube comprising a first end and a second end, wherein a first opening and a second opening in proximity to the first end and the second end respectively;
    a plurality of ribs coupled to the elongated tube at the first end;
    a runner operable along the elongated tube, wherein the movement of runner along the elongated tube allows to collapse and to open the ribs, and wherein the runner comprises a protrusion; and
    a disposable bag coupled to the ribs,
    wherein the runner is moved to lock the protrusion at the first opening to spread the ribs, and the runner is moved to lock the protrusion at the second opening to collapse the ribs, wherein when the ribs are spread out, the disposable bag is aligned with a derriere of a pet to collect the animal waste during defecation process of the pet.

* * * * *